(12) United States Patent
Nguyen et al.

(10) Patent No.: US 6,188,545 B1
(45) Date of Patent: Feb. 13, 2001

(54) MOVEABLE DISK WIPER APPARATUS AND METHOD

(75) Inventors: Long Nguyen, San Jose; Venkat R. Koka, Pleasanton; Frank Morris, San Jose; Syed Iftikar, Pleasanton, all of CA (US)

(73) Assignee: Castlewood Systems, Inc., Pleasanton, CA (US)

( * ) Notice: Under 35 U.S.C. 154(b), the term of this patent shall be extended for 0 days.

(21) Appl. No.: 09/360,489

(22) Filed: Jul. 23, 1999

Related U.S. Application Data
(60) Provisional application No. 60/107,861, filed on Nov. 9, 1998.

(51) Int. Cl.[7] .............................. G11B 3/58; G11B 33/14
(52) U.S. Cl. ........................................ 360/128; 360/97.02
(58) Field of Search ............................. 360/97.01, 97.02, 360/98.01, 128, 135

(56) References Cited

U.S. PATENT DOCUMENTS

| | | | |
|---|---|---|---|
| 3,817,538 | * 6/1974 | Jenrick | 369/74 |
| 4,107,810 | * 8/1978 | Varni et al. | 15/97.1 |
| 4,139,201 | * 2/1979 | English | 15/1.51 |
| 4,392,170 | 7/1983 | Okada | 360/133 |
| 4,449,214 | * 5/1984 | Rangabe | 369/72 |
| 4,482,929 | 11/1984 | Beck et al. | 360/133 |
| 4,734,815 | 3/1988 | Naganawa et al. | 360/133 |
| 4,969,061 | 11/1990 | Patterson et al. | 360/133 |
| 4,985,799 | 1/1991 | Doi | 360/133 |
| 5,006,948 | 4/1991 | Fukunaga et al. | 360/133 |
| 5,046,171 | 9/1991 | Yamashita et al. | 360/133 |
| 5,083,231 | * 1/1992 | Veenstra et al. | 360/133 |
| 5,524,313 | * 6/1996 | Sato | 15/88.3 |
| 5,654,847 | * 8/1997 | Yagi et al. | 360/97.02 |
| 5,850,321 | * 12/1998 | McNeil et al. | 360/106 |

FOREIGN PATENT DOCUMENTS

| | | |
|---|---|---|
| 2 406 275 | * 5/1979 | (FR) . |
| 2 066 998 | * 7/1981 | (GB) . |
| 56-098729 | * 8/1981 | (JP) . |
| 61-077181 | * 4/1986 | (JP) . |
| 63-244456 | * 10/1988 | (JP) . |
| 63-249993 | * 10/1988 | (JP) . |
| 2-226577 | * 9/1990 | (JP) . |
| 3-016075 | * 1/1991 | (JP) . |
| 4-078084 | * 3/1992 | (JP) . |
| 4-146583 | * 5/1992 | (JP) . |
| 8-297954 | * 11/1996 | (JP) . |
| 98/53455 | * 11/1998 | (WO) . |

* cited by examiner

Primary Examiner—William Klimowicz
(74) Attorney, Agent, or Firm—Townsend and Townsend and Crew LLP

(57) ABSTRACT

Methods and apparatus for increasing the reliability of removable storage media by dynamically reducing particulate contaminants from magnetic disks. The apparatus and methods include using wipers which slidingly engage both sides of the magnetic disk as the disk rotates, in order to reduce particulates. In some embodiments, the wiper can be coupled to a swing-type actuator or to any resilient member which can be moved over the surface of the magnetic disk.

23 Claims, 4 Drawing Sheets

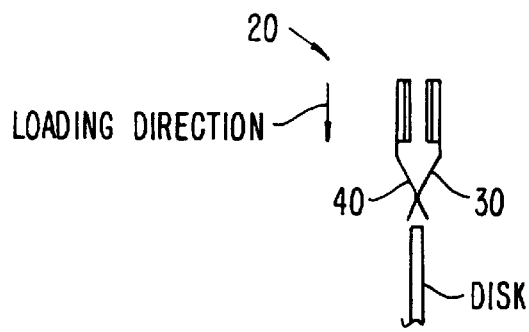
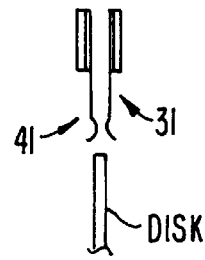
FIG. 1A.
FIG. 1B.
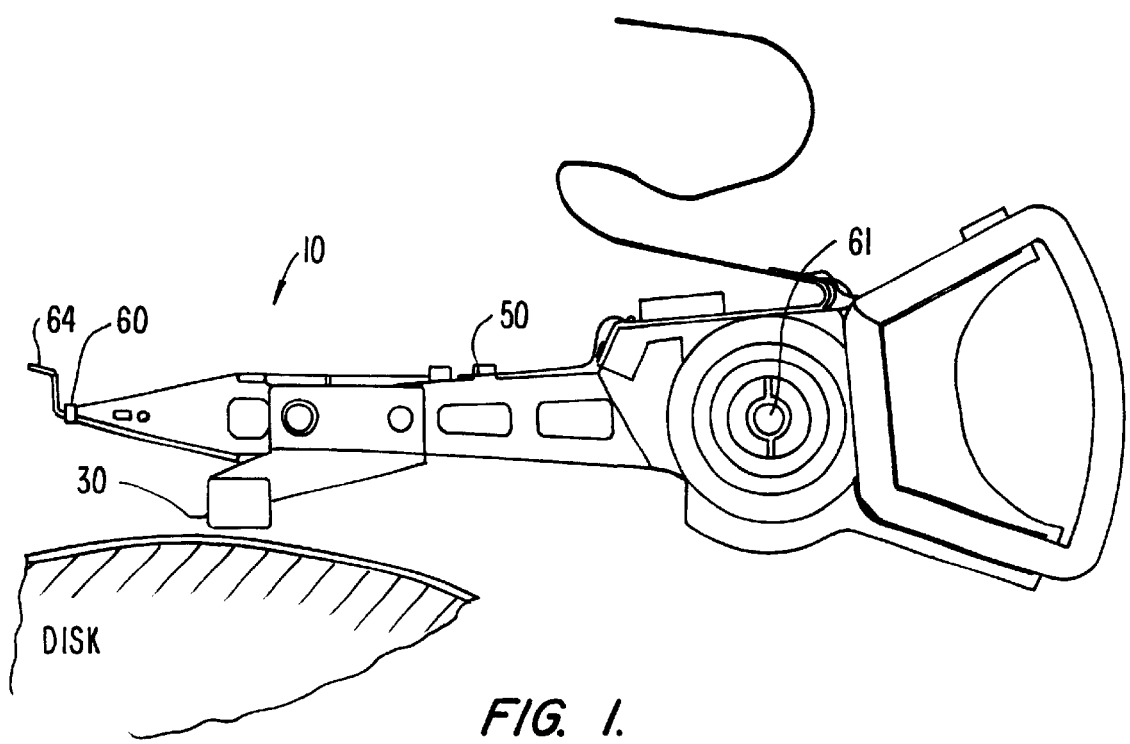
FIG. 1.

MOVEABLE DISK WIPER APPARATUS AND METHOD

This application claims the benefit and priority of Provisional Application Serial No. 60/107,861, filed Nov. 9, 1998, which is herein incorporated by reference for all purposes.

BACKGROUND OF THE INVENTION

The present invention relates to increasing the reliability of storage media. In particular, the present invention relates to methods and apparatus for reducing particulate contamination in removable storage media.

Particulate contamination has been discovered as a significant cause of failures of removable storage media, such as removable disk cartridges. Examples of such contaminants include dust, hair, organic compounds, food crumbs, smoke particles, and the like. These particles often cling to the surface of disks within disk cartridges and adhere to the surface, even when the disks are spinning around at the operating speed, for example 5000 rpm to 7500 rpm.

Conventional storage habits contribute to particulate contamination. Removable disk cartridges are designed to be repeated inserted and removed from disk drives. When not in use, these disk cartridges are often stored on dusty shelves, in lint filled pockets, in piles next to computers, and the like. Seldom are disk cartridges returned to the relatively "clean" disk cartridge holders. This typical user behavior often causes a great number of particulate contaminants to adhere to the outside casing of these disk cartridges. When these disk cartridges are inserted into a disk drive, the particles are then introduced into the interior of the disk drive, and thus onto the disk itself.

Particulate contamination can cause defects on the disk and cause irreversible disk drive hardware damage. As is known, conventional read/write heads that transfer data from disks are often very delicate and "fly" over the surface of the disk at a very low height. Contaminants on the surface of a disk that strike the read/write heads at the operating rpm are often sufficient to knock the read write heads out of alignment. As can be expected, the size of the contaminants that can cause such damage decreases as the physical size of the read/write head decreases and the data density of the disk cartridges increase.

One previous method to reduce the number of particulate contaminants on a disk is found on conventional 3.5" floppy disks. This solution has been to provide a particulate trapping material (filter material) on at least one inner surface of a floppy disk. The filter material is typically in the same size and shape as the disk media. Because the disk media is flexible and undulates while being operated, the disk media often bends sufficiently to touch the filter material. The portion of the disk that touches the filter material thus has reduced particulate contamination. A further enhancement has been to force at least a portion of the filter material towards the disk so as to cause the filter material to touch the disk at particular locations.

One drawback to these solution is that excessive amounts of filter material must be used. The filter material must be formed in substantially the same size and shape as the disk media because the locations where the disk media will bend and touch the filter material are unpredictable. The filter material is thus typically placed at all possible places the disk may bend and touch the filter material.

Other drawbacks to these solutions include that having a filter material in constant contact with the disk causes increased abrasion of the disk and increased torque required for the disk drive motor. As is expected, having the filter material in constant contact with the disk also causes a physical drag on the rotation of the disk. To compensate for the increased drag, the torque provided by the drive motor of the disk drive must be increased, otherwise the disk drive motor may burn out prematurely. The increased torque requirement translates to a higher cost for the drive motor.

Other drawbacks to these solutions include the increased abrasion and heating to the disk and subsequent effects on long term storage characteristics of the disk, and the like.

What is thus required are improved methods and apparatus for reducing particulate contamination in removable disk cartridges without significant effects on drive performance.

SUMMARY OF THE INVENTION

The present invention relates to methods and apparatus for increasing reliability of removable storage media. In particular, the present invention relates to methods and apparatus for dynamically reducing particulate contaminants from magnetic disks. The apparatus includes a wiper which slidingly engages the magnetic disk as the disk rotates, in order to reduce particulates. In some embodiments, the wiper can be coupled to a swing-type actuator or to any resilient member which can be moved over the surface of the magnetic disk. The wiper can include a top portion and a bottom portion, oppositely disposed from one another, such that the top portion can be urged against a top surface of the disk, while the bottom portion can be urged against a bottom surface of the disk. A filter material is disposed on the top and bottom portions of the wiper. The filter material is used to remove particulates and is formed in substantially the same size and shape as the wiper. The locations on the disk where the filter material touches the disk can be accurately predicted, which allows the amount of filter material used to clean the disk surface to be reduced. Since the amount of filter material in constant contact with the disk is reduced the amount of abrasion to the disk, heating of the disk, and torque required of the disk drive motor, is also reduced. Thus, the present invention provides for reduced particulate contamination in removable disk cartridges without significant effects on drive performance.

According to one aspect of the present invention, an apparatus for increasing the reliability of a magnetic disk includes a resilient member movable over a surface of a magnetic disk and a means for reducing the particulate contamination of the magnetic disk. The means is coupled to the resilient member. Another means is provided for urging the reducing means towards the magnetic disk.

According to another aspect of the present invention, an apparatus is provided for removing particulates from a magnetic disk, which includes an actuator arm movable over a magnetic disk. Coupled to the actuator arm are top and a bottom wipers. The wipers each have a filter material disposed on a portion of each wiper. Also provided is a means for urging the filter material towards a surface of the magnetic disk.

According to another aspect of the present invention, a method is provided for removing particulates from a magnetic disk. The method includes providing a wiper having a particulate trapping region; and passing the wiper over the working portion of a disk.

Further understanding of the nature and advantages of the invention may be realized by reference to the remaining portions of the specification and drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which:

FIG. 1 is a simplified illustration of a top view of an embodiment of the present invention;

FIGS. 1A and 1B are simplified illustrations of an end view of embodiments of the present invention;

DESCRIPTION OF THE SPECIFIC EMBODIMENTS

Figure 2:
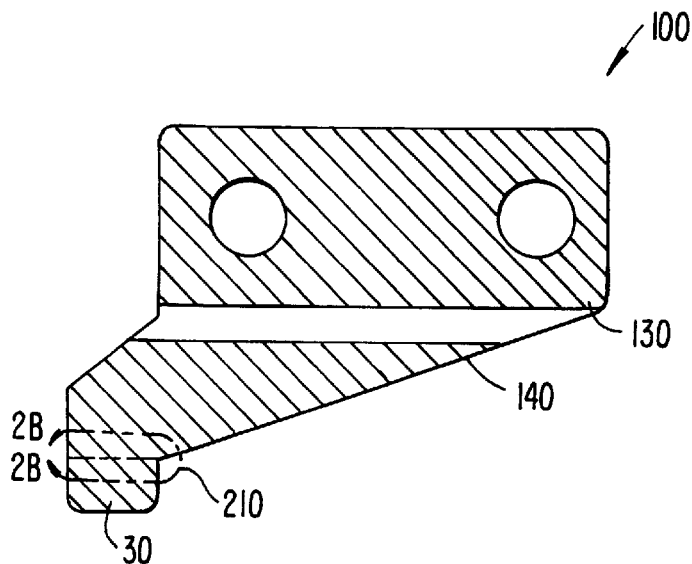
FIGS. 2–2C illustrate simplified top and side views of a top wiper according to an embodiment of the present invention.

FIGS. 1 and 1A include a top view 10 and an end view 20 of an embodiment of the present invention. Top view 10 includes a view of a top wiper 30 according to the present embodiment. End view 20 includes a view of top wiper 30 and a bottom wiper 40. FIG. 1B illustrates an alternative end view 21 of an embodiment having a top wiper 31 and a bottom wiper 41.

Top wiper 30 and bottom wiper 40, described in more detail below, are shown attached to actuator arm assembly 50 having magneto-resistive read and write heads 60. Top wiper 30 and bottom wiper 40 are typically coupled to actuator arm assembly 50 via an adhesive. Alternatively, top wiper 30 and bottom wiper 40 may be coupled to actuator arm assembly 50 by any other conventional techniques, such as screws, rivets, welding, gluing and the like. As can be best understood with reference to FIG. 1, heads 60 are supported by arm assembly 50, which is, in turn, angularly positioned by a voice coil motor (not shown). Arm assembly 50 pivots about an axis 61. Heads 60 are typically supported on resiliently flexible arm extensions. Lifting wires 64 extend both distally and laterally from adjacent heads 60. The lifting wires 64 can engage a head load ramp when arm assembly 50 is retracted so that heads 62 are clear of the cartridge receptacle, and to facilitate transitioning of the heads to the recording surface from a parked position. One embodiment of arm assembly 50 is made by Nittoku Engineering Company, Ltd., 5-11-20 Shirahata, Urawa City, Saitama Pref. Japan 336.

Figure 2B:
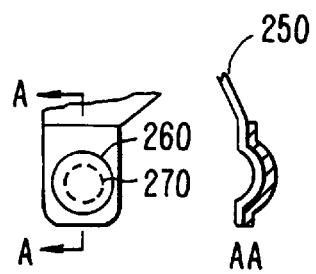
Figure 2A:
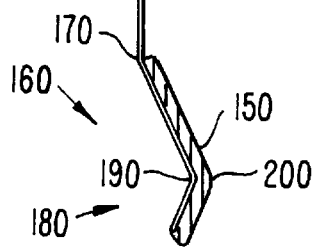
Figure 2A:

Referring now to FIGS. 2 and 2A, which are simplified illustrations of a top view 100 and a side view 110 of top wiper 30 according to the present invention.

Wiper 30 can be formed of a variety of geometries, which may include a plurality of materials and a range of thickness. In one embodiment as illustrated in FIGS. 2 and 2A, wiper 30 is typically formed from a single piece of material that is light-weight and durable. Furthermore, the wiper material should retain the configured geometry so as to maintain approximately a same force between the wiper and the disk over a substantial period of time. Preferably, the material may include Mylar, Kapton, or a similar material, which can be formed in the illustrated geometry. The thickness of the material may be in the range of 0.05 to 0.10 mm, preferably 0.08 mm.

The crosshatched regions 130 and 140 illustrate regions of wiper 30 that include a pressure sensitive adhesive (PSA). Pressure sensitive adhesive region 130 is used in this embodiment to secure the wiper to actuator arm 50, illustrated in FIG. 1, or the like. Pressure sensitive adhesive region 130 provides a region where a particulate trapping material, described below, may be affixed via PSA, or the like. The PSA may include 3M 9462P or Flexcon V-24. The PSA regions 130 and 140 may have a thickness ranging from 0.01 to 0.08 mm, preferably 0.05 mm. The PSA regions 130 and 140 may also include a silicon-free and tin-free release liner.

In the present embodiment illustrated in FIG. 2A, a portion 160 of wiper 30 may be biased toward a disk in response to a pre-formed bend 170 in wiper 30. In operation, the amount of deflection by portion 160 in response to the wiper being in contact with the disk is typically on the order of 0.4 mm or less. This deflection typically imparts a force between 0.25 grams to 1 gram and therefore a torque on the disk. The amount of torque developed by the force on the wiper is typically less than one hundredth the amount of torque provided by the spindle motor. Preferably the amount of developed torque is typically less than one thousandth the amount of torque provided by the spindle motor.

Another portion 180 of the wiper is turned away from the disk in response to a reverse pre-formed bend 190 in the wiper. Portion 180 provides a lip allowing the wiper to be "loaded" onto the disk at location 200.

In the present embodiment, the geometry of bottom wiper 40 is a mirror image of top wiper 30. In operation, as illustrated in FIGS. 1 and 1A, top wiper 30 and bottom wiper 40 both typically contact the disk at opposite positions on the disk. As can be determined in FIG. 2, the point of contact between wipers 30 and 40 and the disk is within location 210. Depending upon the thickness and characteristics of the particulate trapping material used, the contact portion may be embodied as having a contact width of about 0.10 mm or less, preferably, of 0.7 millimeters or less.

Pre-formed bends 170 and 190 are shown approximately parallel to each other. In other embodiments, pre-formed bend 190 may be at an angle relative to pre-formed bend 170. Typically, the angle should not be so large that portion 180 does not provide the lip as described above. The angle may range from about 20° to about 40°, preferably 30°.

Figure 2C:
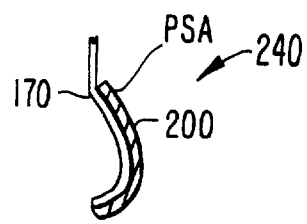

Other shapes for portion 180 of the wipers may be used depending on the requirements of the application. For example, wiper 30 may be formed in a semi-circular shape as shown by inset 240 of FIG. 2B. Alternatively, the pre-formed bend may provide a surface that is approximately parallel with the disk as shown by inset 250 of FIG. 2C. In the embodiment of FIG. 2B, a circular dimple 260 may be stamped or otherwise formed onto the wiper such that there is a circular contact 270 between the wiper and the disk. Alternative wiper shapes may be envisioned in light of the present invention disclosure, which may have a substantially different shape depending upon application requirements and would therefore not be beyond the scope of the present invention. For example, a larger contact area between the wipers and the disk may be required, such that the wiper may include a larger PSA region 130 for providing a more secure attachment to actuator arm 50.

Figure 3:
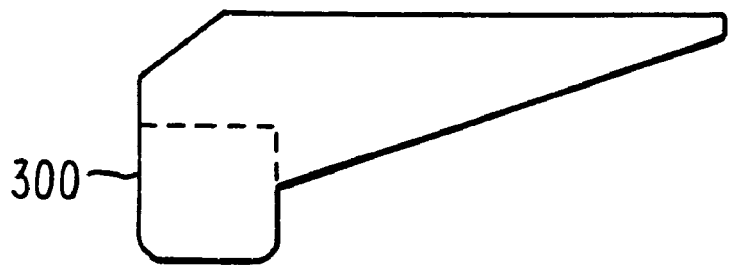
FIGS. 3 and 3A illustrate an embodiment of a particulate trapping material.
Figure 3A:
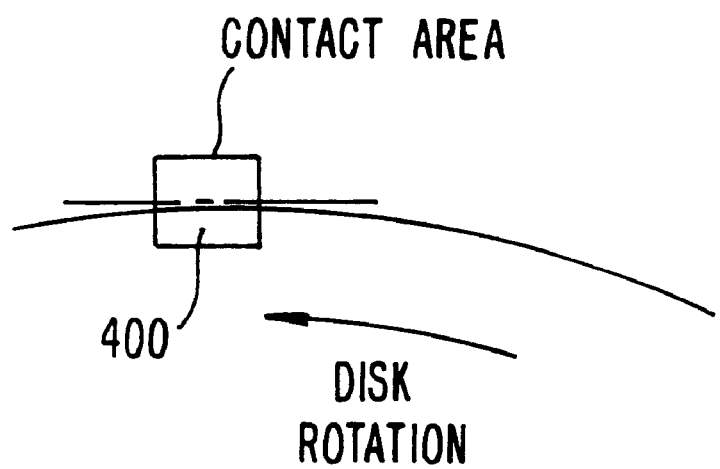

Referring now to FIGS. 3 and 3A, simplified illustrations of an embodiment of a particulate trapping material are shown. The material is embodied having the geometry illustrated to substantially conform to the shape of the wiper. However, it should be understood that the geometry of the wipers may vary depending on a specific applications requirements. In one embodiment of the present invention, where the shape of the wiper may be different from that shown, the material shape may also have a different shape. The material may simply be a rectangular shape 300 such as shown in FIG. 3, in one embodiment.

In the embodiment of FIGS. 3 and 3A, the material used may be the same filter material as presently found in most conventional 3.5" floppy disk drives. These materials include rayon, polyester, nylon cloth, or the like. The surface area of the filter material should be sufficient to clean the entire data surface of the disk. Other materials which have reduced disintegration properties upon multiple loading and unloading and which provide similar material characteristics as the materials listed may be selected. Their use with the present invention would not be beyond the scope of the present invention.

Figure 4:
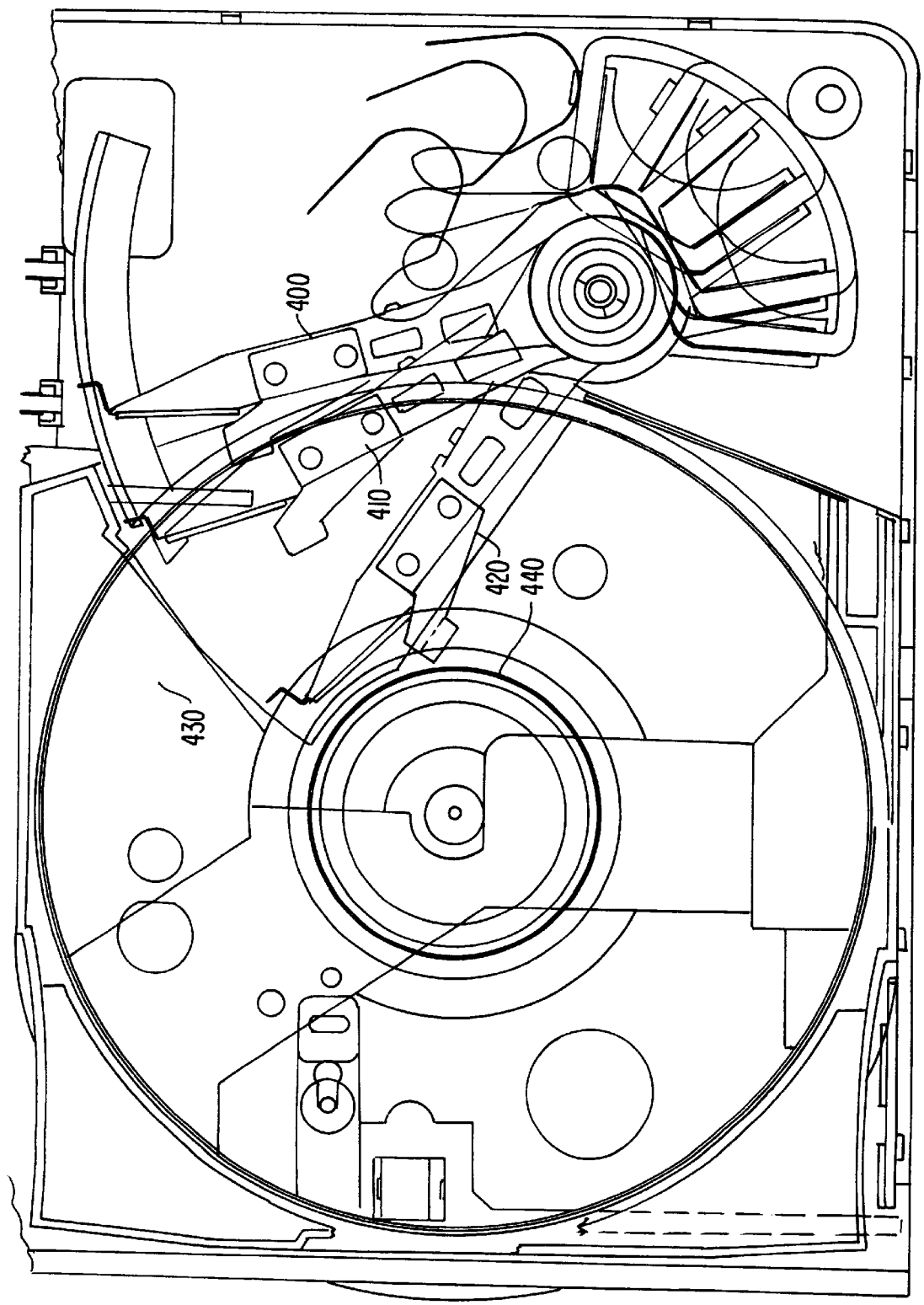
FIG. 4 illustrates an embodiment of the present invention.

The present embodiment is illustrated in FIG. 4 at three representative operational locations within a typical disk drive: at the outer diameter location 400, at the magneto-resistive head (MR) loading location 410, and at the inner diameter location 420.

At location 400, the wiper is initially loaded upon the disk and begins removing particles from the surface on the disk. At this location, the MR heads are still loaded on the head unload ramp. By the time the wiper reaches location 410, the wiper has passed over region 430 on the disk in advance of the MR heads, and attempted to remove particles from this disk. At this location, the MR heads are loaded onto the disk.

At location 420, the wiper is positioned such that the MR head can read or write data from the inner diameter of the disk, and at the same time the wiper is positioned such that the wiper does not interfere with the disk hub 440. The exact offset and positioning of the wiper contact area can vary significantly upon exact embodiment of the present invention.

At location 410, the long axis of the wiper is approximately co-linear with a data track on the disk. In order to maintain the particle inhibiting characteristic of the wiper, it is preferred that the length of the contact area be long enough to have portions that are not co-linear with a data track. For example, as illustrated in FIG. 3A, the wiper is co-linear only at a small portion. In one embodiment, a wiper length of approximately 2.7 mm is used, in another embodiment the wiper length is greater than 3 mm.

In the foregoing specification, the invention has been described with reference to specific exemplary embodiments thereof. Many changes or modifications are readily envisioned. For example, the wiper need not be attached to the actuator arm. In such an embodiment, an independent beam is provided having the wiper affixed thereto. The beam would preferably move the wiper over the surface of the disk before the MR heads are loaded onto the disk, and the like. In another embodiment, the wiper can be affixed such that the wiper contact area is approximately co-linear with the MR heads for all working locations of the MR head on the disk.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. An apparatus for increasing the reliability of a removable magnetic disk, the apparatus comprising:
    a resilient member movable over a surface of the removable magnetic disk, the resilient member comprising a data transfer head;
    means for reducing the particulate contamination of both sides of the magnetic disk, the reducing means being positioned laterally of and coupled to the resilient member; and
    means for urging the reducing means towards the magnetic disk, wherein the reducing means is configured to move over the removable magnetic disk prior to the data transfer head moving over the magnetic disk.
2. An apparatus as in claim 1, wherein the resilient member is a swing-type actuator arm.
3. An apparatus as in claim 1, wherein the reducing means comprises a filter material which slidingly engages the magnetic disk.
4. An apparatus as in claim 3, wherein said filter material is taken from the group consisting of rayon, polyester and nylon.
5. An apparatus as in claim 1, wherein the reducing means comprises a wiper having a top portion and a bottom portion, the top portion oppositely disposed from the bottom portion.
6. An apparatus as in claim 5, wherein the top portion and the bottom portion are biased toward the magnetic disk in response to a pre-formed bend in each portion.
7. An apparatus as in claim 6, wherein an amount of deflection by the pre-formed bend in response to the pre-formed bend being in contact with the disk is about 0.4 mm or less.
8. An apparatus as in claim 7, wherein the deflection imparts a torque upon the disk, the torque being less than one thousandth the amount of torque used to rotate the disk.
9. An apparatus as in claim 6, wherein a lip portion is formed on the wiper by forming a reverse pre-formed bend.
10. An apparatus as in claim 1, wherein the urging means comprises a pre-formed bend formed on the reducing means.
11. The apparatus of claim 1 wherein the resilient member comprises a proximal portion and a distal portion, wherein the data transfer head is positioned on the distal portion and the reducing means is positioned proximal of the data transfer head.
12. An apparatus for removing particulates from a magnetic disk, the apparatus comprising:
    an actuator arm movable over a magnetic disk, wherein the actuator arm comprises a proximal end and a distal end;
    at least one data transfer head positioned adjacent the distal end of the actuator arm;
    a top wiper and a bottom wiper, the wipers coupled to the actuator arm and positioned proximal of the data transfer head, the wipers each having a cleaning material disposed on a portion of each wiper; and
    means for urging the filter material towards a surface of the magnetic disk, wherein said wipers are configured to move over the magnetic disk prior to the data transfer head moving over the magnetic disk.
13. An apparatus of claim 12, wherein said wiper has a length greater than 3 mm.
14. An apparatus of claim 12, wherein said cleaning material is taken from the group consisting of rayon, polyester and nylon.
15. An apparatus of claim 12, wherein said wipers are biased toward the magnetic disk in response to a pre-formed bend.
16. The apparatus of claim 12 wherein the wipers are positioned laterally of the actuator arm.
17. A method for removing particulates from both sides a magnetic disk comprising:
    providing an actuator arm comprising data heads and a plurality of movable wipers having a particulate trapping region, wherein the wipers are positioned laterally from the actuator arm and coupled thereto; and
    passing the actuator arm and wipers over at least a portion of a disk, wherein the wipers are moved over the magnetic disk prior to the data heads moving over the magnetic disk.
18. The method of claim 17, wherein the data head comprises a magneto-resistive read head.
19. The method of claim 18, further comprising loading the magneto-resistive read and head onto the disk.

20. A method as in claim 17, wherein the particulate trapping region comprises a filter material taken from a group consisting of rayon, polyester and nylon.

21. A method as in claim 17, wherein the wipers comprises a top wiper and a bottom wiper, the top wiper and bottom wiper disposed against opposite surfaces of the disk.

22. A method as in claim 17, wherein the passing comprises urging the particulate trapping region towards the surface of the magnetic disk.

23. The method of claim 17 wherein the movable wipers are positioned proximal of the data heads.

* * * * *